United States Patent

[11] 3,568,055

[72] Inventor Wolfgang Wehrmann
     Vienna, Austria
[21] Appl. No. 672,093
[22] Filed Oct. 2, 1967
[45] Patented Mar. 2, 1971
[73] Assignee Norma Fabrik elektrischer Messgerate
     Gesellschaft m.b.H.
     Vienna, Austria
[32] Priority Oct. 6, 1966
[33] Austria
[31] 9356/66

[54] ELECTRONIC DEVICE FOR MEASURING STATISTICAL PARAMETERS OF STOCHASTICAL PROCESSES
14 Claims, 10 Drawing Figs.

[52] U.S. Cl. .................................................. 324/77, 328/117
[51] Int. Cl. ............................................... G01r 23/16
[50] Field of Search .................................... 324/77 (A); 328/116, 117; 179/15.55

[56] References Cited
UNITED STATES PATENTS

| | | | |
|---|---|---|---|
| 2,779,869 | 1/1957 | Gerks | 324/77(A)X |
| 2,820,896 | 1/1958 | Russell et al. | 324/77(A)UX |
| 3,023,966 | 3/1962 | Cox et al. | 324/77(H)UX |
| 3,125,721 | 3/1964 | Schumann | 324/77(A)X |
| 3,422,349 | 1/1969 | Makino | 324/77(A) |

FOREIGN PATENTS

| 1,175,470 | 8/1964 | Germany | 324/77(H) |

Primary Examiner—Edward E. Kubasiewicz
Attorney—Holman, Glascock, Downing and Seebold ABSTRACT: An electronic device for measuring statistical parameters of a stochastical process represented by an electrical signal which is sampled by a clock frequency, the sampled values being divided into at least two classes of sizes by comparison with at least one controllable threshold voltage, and statistical parameters of the stochastical process measured, comprising at least one controllable sampled amplitude discriminator the input of which is connected to the electronic source of said signal and an automatic device having at least one set of bistable elements and at least one set of electronic means for controlling the sampled amplitude discriminator.

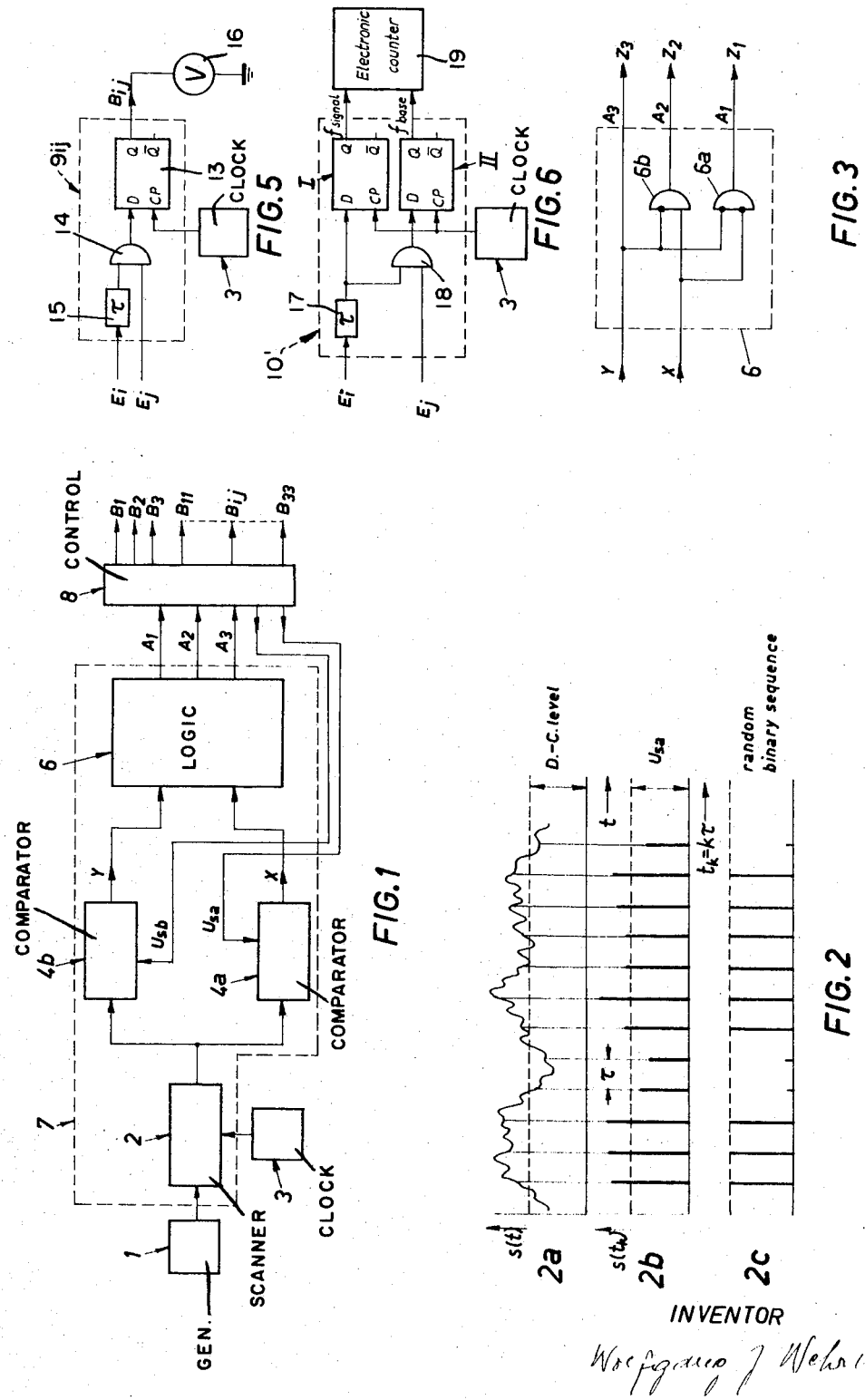

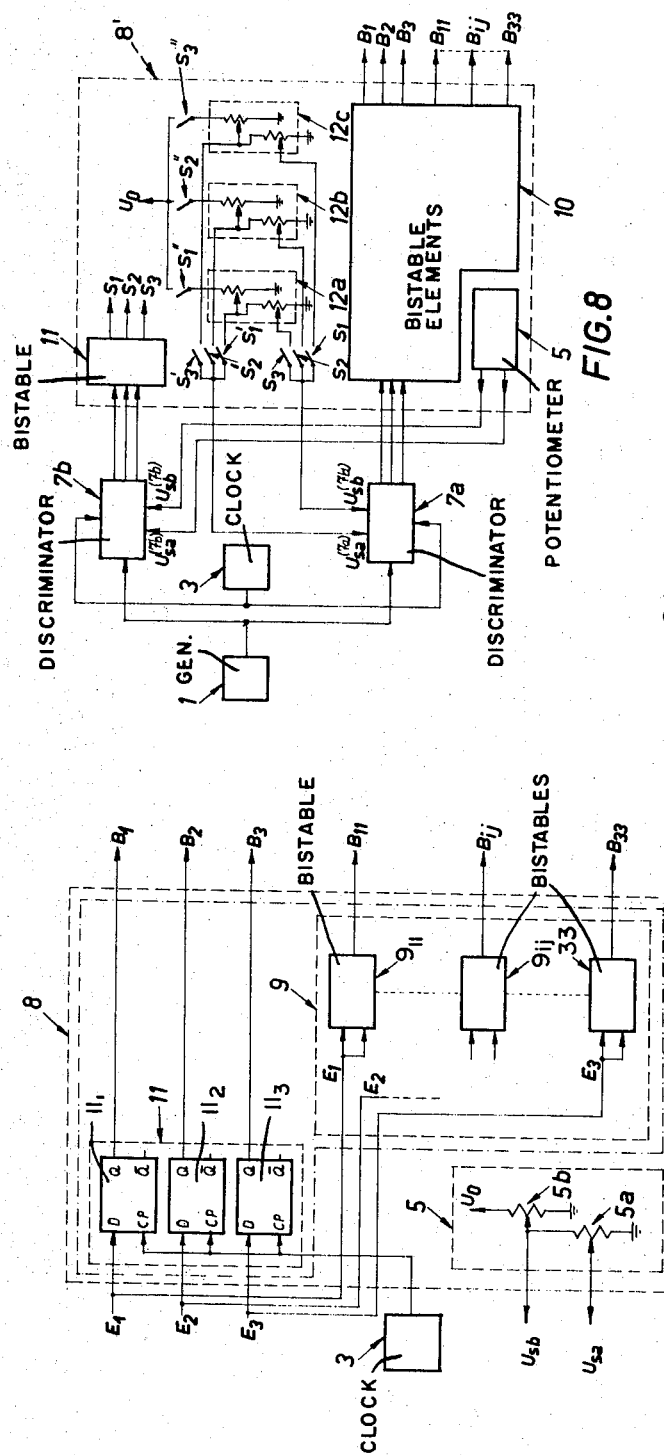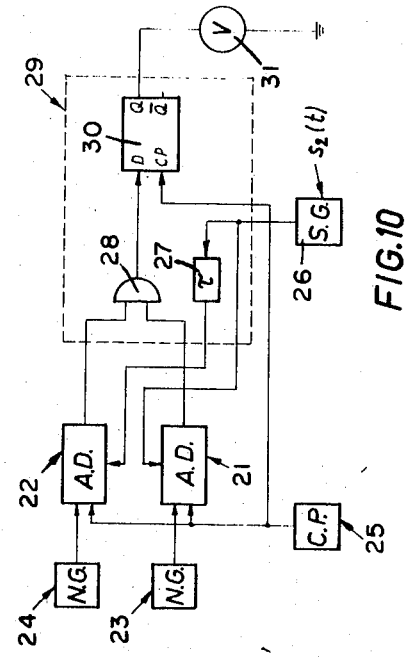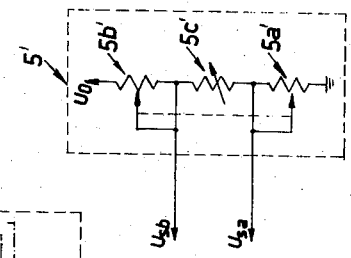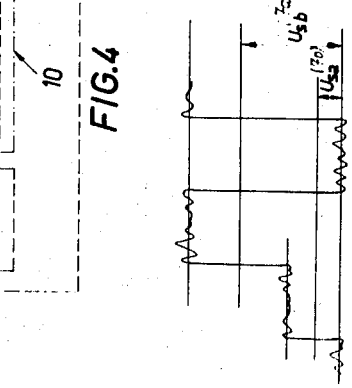
INVENTOR
Wolfgang J. Wehrmann

3,568,055

ELECTRONIC DEVICE FOR MEASURING STATISTICAL PARAMETERS OF STOCHASTICAL PROCESSES

The present invention relates to an electronic device for measuring statistical parameters of a stochastical process the values of which being represented by an electrical signal which is sampled by a clock frequency, the sampled values being divided into at least two classes of sizes of amplitudes by comparison with at least one controllable DC level (threshold voltage), and statistical parameters of the classes, for example total, joint and conditional probabilities or correlation functions and spectra, respectively, are measured. The electrical signal represents a stochastical process which is already electronically generated or, by means of a transducer, in said signal transduced.

Devices for classification of stochastical processes are known, some have mechanical, some electromechanical construction (for instance: Austrian Pat. Nos. 175, 084; 202, 385; 203, 247; 206, 677). Also known are machines for determination the relative frequency of random events (for instance: relative frequency counter 4420 of Bruel & Kjaer, Denmark). The disadvantages of said known devices and other well known procedures for classification or measuring statistical parameters of stochastical processes are that only the total probabilities of only slowly fluctuating processes can be measured and any variation of the class sizes is very complicated, which variation requires, for instance the changing of mechanical components of said devices.

An object of this invention is to achieve the measuring of probabilities in a new and very profitable advantageous manner with respect to prior art, especially to provide an amplitude distribution measuring system in which the sizes of the classes of amplitude can be easily and continuously varied, the variation being performed either manually or under the control of an electrical signal, for measuring statistical parameters of at least one stochastical process. It is a further object of the invention to provide an electronic device which is applicable when the concerned stochastical process has high frequency components, too.

Another object of the invention is to provide an electronic device adapted to control each class volume in dependence of an own or the same stochastical process, eventually processed by communication systems, for measuring correlation functions and spectra of these stochastical processes.

With this objects in view the invention provides an electronic device comprising in combination at least one controllable sampled amplitude discriminator the input of which is connected to the electronic source of the electrical signal representing the stochastical process, and an automatic device with at least one set of bistable elements storing the states of the automatic device, said set having at least one bistable element being connected to a gate, with at least one set of electronic means having outputs controlling the sampled amplitude discriminator eventually in dependence of the momentary states of the automatic device, and with outputs delivering the output voltages which correspond to the states of the automatic device and are obtained for measuring statistical parameters of the stochastical process.

Further objects, features and advantages of the invention will be more apparent from the following description taken in connection with the accompanying drawing, wherein:

FIG. 1 is a block diagram of one embodiment of the present invention;

FIG. 2 shows the signal processing in the sampled amplitude discriminator;

FIG. 3 shows details of the logical network;

FIG. 4 shows details of the automatic device;

FIG. 5 and FIG. 6, respectively, show particular sets of the bistable elements for measuring the joint and conditional probabilities, respectively;

FIG. 7 is an arrangement of the electronic components for controlling the sampled amplitude discriminator;

FIG. 8 is a modified electronic device for measuring statistical parameters of stochastical processes which are mixed with other signals;

FIG. 9 is a diagrammatic view of a stochastical process mixed with a step function; and FIG. 10 shows a block diagram of an electronic device for measuring correlation functions and spectra.

A sampled amplitude discriminator 7 of FIG. 1 classifies the sampled amplitudes of the stochastical process into three classes. A signal source 1 generates a stochastical process $s(t)$ with an additive DC level, so that the sampled amplitudes have only one polarity. A scanner 2 transduces the stochastical process into an amplitude modulated pulse. The scanner 2 is connected to an adjustable clock frequency generator 3. The output of the scanner 2 is connected to decision networks $4a$ and $4b$ which are fed with the amplitude modulated pulse and decide whether the pulse amplitudes are greater or less than the threshold voltages $U_{sa}$ and $U_{sb}$, respectively.

Such a decision procedure is explained in detail in FIG. 2. The stochastical process $s(t)$ with additive DC level is shown in FIG. $2a$ and the derived amplitude modulated pulse in FIG. $2b$. The sampled values $s(t_k)$ are compared with a threshold voltage for instance $U_{sa}$. It is evident that an unipolar amplitude modulated pulse simplifies the comparison procedure. If the value $s(t_k)$ is greater than $U_{sa}$, then at the output of the decision network $4a$ the event $X$ occurs as an impulse, else as no impulse (FIG. $2c$). The sequential occurence of the events $X$ is a binary random sequence. The decision network $4b$ works quite similarly and generates a binary random sequence $Y$.

The outputs $X$, $Y$ of the decision networks $4a$ and $4b$ are connected to a logical network 6 having gates $6a$ and $6b$ (FIG. 3). Said network 6 is fed with the binary random sequences $X$ and $Y$ (FIGS. 1 and 3) and generates three new binary random impulse sequences $Z_1$, $Z_2$, $Z_3$, which are obtained at the outputs $A_1$, $A_2$, $A_3$ of the logical network 6. For explaining the logical structure of the logical network 6 it is useful to define an equivalence between the event impulse or no-impulse, respectively, and a logical ONE or ZERO, respectively.

The outputs $A_1$, $A_2$ and $A_3$ of the logical network 6 (FIGS. 1 and 3) are connected to an automatic device 8 shown in FIGS. 1 and 4 and having a set of electronic means 5 for controlling the sampled amplitude discriminator 7. The electronic means 5 comprises two potentiometers $5a$ and $5b$. According to FIG. 4 potentiometer $5a$ is connected between the slider and the grounded terminal of potentiometer $5b$ so that the relation $$0 \leq U_{sa} \leq U_{sb} \leq U_0 \text{ with } U_0 = \{|s(t)|\}_{max}$$

holds, and the occurence of an impulse in the sequence $Y$ implies an impulse in the sequence $X$, so that the following three different cases of the joint event $(X, Y)$ can be distinguished:

1. $X = 0$, $Y = 0$ is equivalent to the relation
   $0 \leq |s(t_k)| \leq U_{sa}$ which determines the first class of amplitude values
2. $X = 1$, $Y = 0$ is equivalent to the relation
   $U_{sa} \leq |s(t_k)| \leq U_{sb}$ which determines the second class of amplitude values
3. $X = 1$, $Y = 1$ is equivalent to the relation
   $U_{sb} \leq |s(t_k)| \leq U_o$ which determines the third class of amplitude values Other cases of the joint event $(X, Y)$ are impossible. FIG. 3 makes clear that each of these cases implies an impulse at the respective output of the logical network 6. The respective equivalent relations define the corresponding classes of amplitude values and dependence of the class volumes related to the threshold voltages $U_{sa}$ and $U_{sb}$, respectively. The three random sequences $Z_1$, $Z_2$, $Z_3$ correspond to the three classes of amplitude values and control the automatic device 8.

The automatic device 8 shown in FIG. 4 has a set 5 of electronic means controlling the sampled amplitude discriminator and a set 10 of bistable elements. The set 10 comprises a set 9 of units $9_{ij}$, wherein $i, j = 1, 2, 3$, and a set 11 of flip-flops $11_j$ ($j = 1, 2, 3$). As shown in FIG. 4 each flip-flop $11_j$ has an input $E_j$ connected to the corresponding output $A_j$ of the logical network 6 (FIG. 1) and an input connected to the adjustable clock frequency generator 3. As shown in FIG. 5 each unit $9_{ij}$ comprises a flip-flop 13, an AND-gate 14 and a delay circuit 15, the inputs of the flip-flop being connected to the AND-gate and to the adjustable clock frequency generator 3, respectively. The automatic device 8 delivers output voltages for measuring statistical parameters of the stochastical process $s(t)$. In the following paragraphs the procedure of measuring the total, joint and conditional probabilities will be explained.

Connecting the output $A_j$, ($j = 1, 2, 3$), of the electronic device 6 of FIG. 1 with the input $E_j$ of a flip-flop $11_j$ which is set by an impulse at the input $E_j$ and reset if there is no impulse at the input $E_j$, the time average of the output voltage of the flip-flop being directly proportional to the total probability $p(j)$, where $p(j)$ denotes the probability that an amplitude value belongs to the class $K_j$, and is indicated by means of a moving-coil instrument at the output $B_j$. The total probability also may be measured by a digital counter if the external time base input of the counter is fed with the clock frequency and the signal input of the counter is connected to the output $B_j$. For measuring the joint probability $p(i, j)$ which denotes the probability that following amplitudes belong to the classes $K_i$ and $K_j$, ($i, j = 1, 2, 3$) a flip-flop 13 of unit $9_{ij}$ (FIGS. 4, 5) is set if an impulse at $E_i$ immediately follows an impulse at $E_j$, else the flip-flop is reset (FIG. 5). For this reason, the impulse at $E_i$ is delayed by means of the delay circuit 15 connected to the first input of the AND-gate 14, the second input of said AND-gate receiving the impulse at $E_j$. The time average of the output voltage of the flip-flop 13 is directly proportional to the joint probability $p(i, j)$ and may be measured by means of a moving-coil instrument 16 at the output $B_{ij}$. The digital measurement of the joint probability is quite similar to the measurement of the total probability. Three and more dimensional joint probabilities can be measured quite analogous if at coincidence of three or more respective delayed impulses at the corresponding outputs of the sampled amplitude discriminator 7 of FIG. 1 a flip-flop is set, else the flip-flop reset. The time average of the output voltage of the flip-flop is directly proportional to the more dimensional joint probability and may be read out analogue or digital.

The conditional probability $p(j/i)$ denotes the probability that an amplitude value belongs to the class $K_j$ upon the condition that the latest amplitude value belonged to the class $K_i$, and is digitally measured best. For this purpose in a set 10' of bistable elements shown in FIG. 6 a flip-flop I is set if an impulse appears at the input $E_i$, else the flip-flop I is reset. A flip-flop II is set if an impulse at the input $E_j$ coincides with the respective delayed impulse at the input $E_i$, the impulse at $E_i$ being delayed by means of a delay circuit 17 and the coincidence being proved by an AND-gate 18 connected to the delay circuit and the input $E_j$. Further, the flip-flops I and II are connected to the adjustable clock frequency generator 3. Connecting the output of flip-flop I with an external time base input of a digital counter 19, and connecting the output of flip-flop II with its signal input, the counter indicates the conditional probability $p(j/i)$ (FIG. 6).

The application of the invention to the measuring of probabilities can be enlarged if the condition $U_{sb} - U_{sa} = \Delta U_s = $ constant holds for all variations of the threshold voltages $U_{sa}$ and $U_{sb}$. By this way it is possible to move the voltage interval $\Delta U_s$ over the whole amplitude field of the stochastical process and to measure the probability that an amplitude of the stochastical process belongs to this interval. This method has the same effect as an electronic device according to FIG. 1 for $$m = \frac{U_0}{\Delta U_s}$$

equidistant classes, with $U_0 = \{|s(t)|\}_{max}$. For this purpose the potentiometer set 5 in FIG. 1 is replaced by a set 5' (FIG. 7) which consists of two resistors $5a'$ and $5b'$ simultaneously variable in opposite sense which are connected in series with an adjustable resistor $5c'$ lying between them from ends of which the threshold voltages are picked up. The voltage difference $\Delta U_s$ is varied by the resistor $5c'$. Simultaneous and oppositely directed variation of the resistors $5a'$ and $5b'$ moves the voltage interval $\Delta U_s$ over the whole amplitude field of the stochastical process.

The combination of more sampled amplitude discriminators according to FIG. 1, which are controlled by the same clock frequency but fed with different stochastical processes, with an automatic device 8 according to FIG. 1 allows the measurement of statistical parameters which define the statistical relations between the different stochastical processes. The procedure of measurement is quite similar to the procedures described above. For example the joint probability $p(i^{(I)}, j^{(II)})$ which denotes the probability that an impulse at the output $A_i^{(I)}$ of the sampled amplitude discriminator I appears simultaneously with an impulse at the output $A_j^{(II)}$ of the sampled amplitude discriminator II, is measured by setting a flip-flop if an impulse at $A_j^{(II)}$ coincides with an impulse at $A_i^{(I)}$, and by indicating the time average of the output voltage of the flip-flop by a moving-coil instrument or a digital counter.

FIG. 8 shows a modification of the electronic device according to FIG. 1 for measuring statistical parameters of a stochastical process $s(t)$ which is mixed with a signal $r(t)$ for instance with a step function having three amplitude steps (FIG. 9). The classification of the stochastical process in the described manner is possible if the threshold voltages of the sampled amplitude discriminator 7a are gradually controlled corresponding to the step function. The sampled amplitude discriminator 7b determines the momentary amplitude step of the step function and controls the threshold voltages of the sampled amplitude discriminator 7a in dependence of this step. For this purpose the automatic device 8' of FIG. 8 comprises a set 11 of bistable elements according to FIG. 1 which stores the decision of the sampled amplitude discriminator 7b and changes the adjustable threshold voltages of the sampled amplitude discriminator 7a. If an impulse is obtained at the output $S_i$ of the set 11 the threshold voltages of the amplitude discriminator 7a are changed by closing the switches $s_i, s_i', s_i''$, ($i = 1, 2, 3$). By this procedure one of three potentiometer sets 12a, 12b, 12c is selected and delivers the threshold voltages for the amplitude discriminator 7a. The set of bistable elements 10 is the same as in FIG. 1 and serves for measuring the relative frequency of the automatic device states in the above described manner. This method may be simplified if also $r(t)$ is available. In this case the electronic device of FIG. 1 is used and the potentiometer set 5 is supplied with the voltage $U_0 + r(t)$. At the outputs of the automatic device voltages for measuring statistical parameters of the stochastical process $s(t)$ are obtained.

The electronic device of FIGS. 1 and 8 may be extended for any more classes where for $n$ classes the sampled amplitude discriminator needs ($n - 1$) binary decisions networks and threshold voltages, the logical network comprises ($n - 1$) AND-gates, and the automatic device has at least $n$ bistable elements.

The correlation functions and spectra may be determined by the same procedure as for measuring total probabilities (FIG. 10). For this purpose two sampled amplitude discriminators 21 and 22 are provided, each one fed with an evenly distributed stochastical process which is statistically independent from the other stochastical process, which processes by example are delivered from noise generators 23 and 24, respectively. The amplitude discriminators 21, 22 are sampled by means of a clock pulse generator 25 (FIG. 10). The sampled amplitude discriminator 21 is controlled by a threshold voltage which is directly proportional to a signal $s_2(t)$, produced by an electronic means 26, e.g. a signal generator, the other sampled amplitude discriminator 22 is controlled by a threshold voltage which is directly proportional to the delayed signal $s_2(t + t_1)$. Said delayed signal is produced undelayed by the electronic means 26 and becomes delayed by means of a delay circuit 27 interconnected between said electronic means and the amplitude discriminator 22. The output sequences of the two sampled amplitude discriminators 21, 22 are logically configurated by an AND-gate 28 which is provided in an automatic device 29 having a flip-flop 30. The inputs of said flip-flop 30 are connected to the AND-gate 28 and to the clock pulse generator 25, respectively. The output of said flip-flop 30 is connected to a moving-coil instrument 31. The average of the total probability for an impulse in the output sequence of the AND-gate 28 is directly proportional to the correlation function of $s_2(t)$ for the delay argument $t_1$ and may be read out in analogue or digital manner. If the sampled amplitude discriminators 21, 22 are controlled by a threshold voltage, which is directly proportional to the amplitude of the frequency component $\omega_1$ of $s_2(t)$ which may be obtained by respective filtering of $s_2(t)$, the average of the total probability for an impulse in the output sequence of the AND-gate 28 is directly proportional to the power density spectrum of $s_2(t)$ for the frequency component $\omega_1$. By using more, for instance $m$, sampled amplitude discriminators in analogous manner the correlation functions and spectra of $(m-1)$ order may be measured.

I claim:

1. In an electronic device for measuring statistical parameters of a stochastical process the values of which being represented by an electrical signal which is sampled by a clock frequency, the sampled values being divided into at least two classes of sizes of amplitudes by comparison with at least one controllable direct current level (threshold voltage), and statistical parameters of the stochastical process being measured, the improvement comprising in combination at least one controllable sampled amplitude discriminator having an input and at least one decision network, which input is connected to the electronic source of the electrical signal representing the stochastical process and which decision network dividing said sampled values into said classes by comparison with said direct current level, and an automatic device having at least one set of bistable elements defining and storing operating states of the automatic device, said set having at least one gate with an output and at least one bistable element having an input being connected to said output of said gate, at least one set of electronic means having outputs controlling the sampled amplitude discriminator, and outputs delivering output voltages which output voltages correspond to the states of the automatic device and which output voltages are obtained for measuring statistical parameters of the stochastical process.

2. An electronic device according to claim 1 wherein the set of electronic means controlling the sampled amplitude discriminator has an input connected to voltages corresponding to the momentary states of the automatic device.

3. An electronic device according to claim 1 wherein the bistable elements of the automatic device are flip-flops and the electronic means for controlling the amplitude discriminators are direct current supplied potentiometers.

4. An electronic device according to claim 2 wherein the bistable elements of the automatic device are flip-flops and the electronic means for controlling the amplitude discriminators are direct current supplied potentiometers.

5. An electronic device according to claim 3, comprising a signal source delivering a signal which is independent of the stochastical process wherein the inputs of the flip-flops are connected to said signal source.

6. An electronic device according to claim 1 having a signal generator delivering a signal which is independent of the stochastical process wherein at least one of said sets of electronic means controlling the sampled amplitude discriminators is connected to said signal generator.

7. An electronic device according to claim 2 wherein said automatic device has a set of switches switched in dependence of the momentary state of the automatic device and a plurality of sets of electronic means for controlling the sampled amplitude discriminators, said set of switches connecting one of said sets of electronic means to one of said sampled amplitude discriminators.

8. An electronic device according to claim 3 wherein said potentiometers provided in the automatic device are connected to a constant direct current voltage during a measuring procedure.

9. An electronic device according to claim 8 wherein the potentiometers consist of two variable resistors which are connected in series with an adjustable resistor having two ends lying between them, each of the variable resistors having a slider connected to the adjacent end of said adjustable resistor, said sliders being coupled together and each of the ends of said adjustable resistor being connected to one sampled amplitude discriminator.

10. An electronic device according to claim 1 wherein said at least one discriminator comprises a first and a second controllable sampled amplitude discriminator the inputs of which are connected to the electronic source of the electrical signal representing the stochastical process and an additional signal representing a step function and said automatic device has a first and a second set of bistable elements and a first and a second set of electronic means, the said first set of electronic means controlling said second sampled amplitude discriminator, and the said second set of electronic means controlling said first sampled amplitude discriminator.

11. An electronic device according to claim 1 wherein said at least one discriminator comprises a first and a second sampled amplitude discriminator, the input of the first discriminator being fed with a voltage representing a stochastical process and with an additional signal and the input of the second sampled amplitude discriminator being fed with said additional signal voltage, and the automatic device has at least a first set of bistable elements and a first and a second set of electronic means, the said first set of electronic means controlling said second sampled amplitude discriminator, and vice versa.

12. An electronic device according to claim 1 comprising at least two controllable sampled amplitude discriminators, the input of each one being connected to a separate electronic source which sources deliver electrical signals representing at least two different stochastical processes.

13. An electronic device according to claim 1 comprising stochastical generators each of which has an output delivering a separate evenly distributed stochastical process and one signal generator having an output, the input of each controllable sampled amplitude discriminator being connected to an output of one of said stochastical generators, and all of said amplitude discriminators having control inputs connected to the output of said only one signal generator delivering the signal which is independent of the input signals of said amplitude discriminators.

14. An electronic device according to claim 1 comprising stochastical generators each of which has an output delivering a separate evenly distributed stochastical process and signal generators having outputs, the input of each controllable sampled amplitude discriminator being connected to an output of one of said stochastical generators, and each of said amplitude discriminators having control inputs connected to the output of one of said signal generators which output delivers a signal which is independent of the input signals of said amplitude discriminators.